(12) United States Patent
Abe

(10) Patent No.: US 11,262,179 B2
(45) Date of Patent: Mar. 1, 2022

(54) SURFACE TEXTURE MEASURING DEVICE, SURFACE TEXTURE MEASURING SYSTEM, AND PROGRAM

(71) Applicant: MITUTOYO CORPORATION, Kanagawa (JP)

(72) Inventor: Shinsaku Abe, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 222 days.

(21) Appl. No.: 16/013,275

(22) Filed: Jun. 20, 2018

(65) Prior Publication Data
US 2018/0372473 A1    Dec. 27, 2018

(30) Foreign Application Priority Data

Jun. 23, 2017 (JP) .............................. JP2017-123735

(51) Int. Cl.
| | |
|---|---|
| *G01B 5/28* | (2006.01) |
| *G01B 5/008* | (2006.01) |
| *G01B 17/08* | (2006.01) |
| *G01B 21/04* | (2006.01) |

(52) U.S. Cl.
CPC .............. *G01B 5/28* (2013.01); *G01B 5/008* (2013.01); *G01B 17/08* (2013.01); *G01B 21/045* (2013.01)

(58) Field of Classification Search
CPC .................................. G01B 5/28; G01B 5/008
USPC ........................................................... 73/105
See application file for complete search history.

(56) References Cited

U.S. PATENT DOCUMENTS

| | | | | |
|---|---|---|---|---|
| 3,254,530 A | * | 6/1966 | Ohringer .................. | G01B 7/34 73/105 |
| 7,100,429 B2 | * | 9/2006 | Matsuki .................... | G01B 5/28 33/503 |
| 8,347,697 B2 | * | 1/2013 | Sakata ................. | G01B 21/042 73/105 |
| 9,151,589 B2 | * | 10/2015 | Kanematsu .......... | G01B 21/042 |
| 2001/0029778 A1 | * | 10/2001 | Takemura .............. | G01B 5/016 73/104 |
| 2002/0040595 A1 | * | 4/2002 | Sundaram .............. | G11B 5/488 73/105 |

(Continued)

FOREIGN PATENT DOCUMENTS

JP    2011-169616 A    9/2011

*Primary Examiner* — John Fitzgerald
*Assistant Examiner* — Rodney T Frank
(74) *Attorney, Agent, or Firm* — Greenblum & Bernstein, P.L.C.

(57) ABSTRACT

A surface texture measuring device according to the present invention includes a surface texture detecting component that outputs measurement results for a surface texture of a measurable object, where the measurement results are recognized as a change in the movement of a contact pin of a detector when tracing a surface of the measurable object with the contact pin; a posture detecting sensor that detects a measured posture, which is a posture at the time of measurement by the detector; a memory component that is preloaded with correction values corresponding to each of a plurality of postures; and a correcting component that compares the measured posture with the plurality of postures stored in the memory component, and corrects the measurement results using a correction value that corresponds to a posture equivalent to the measured posture.

13 Claims, 9 Drawing Sheets

(56) References Cited

U.S. PATENT DOCUMENTS

2011/0197665 A1\* 8/2011 Sakata ................. G01B 21/042
                                                                                 73/105
2012/0185210 A1\* 7/2012 Takanashi .............. G01B 5/008
                                                                                 702/168

\* cited by examiner

SURFACE TEXTURE MEASURING DEVICE, SURFACE TEXTURE MEASURING SYSTEM, AND PROGRAM

CROSS-REFERENCE TO RELATED APPLICATIONS

The present application claims priority under 35 U.S.C. § 119 of Japanese Application No. 2017-123735, filed on Jun. 23, 2017, the disclosure of which is expressly incorporated by reference herein in its entirety.

BACKGROUND OF THE INVENTION

1. Field of the Invention

The present invention relates to a surface texture measuring device, surface texture measuring system, and program capable of correcting a measured value in accordance with a posture during measurement.

2. Description of Related Art

A surface texture measuring device is a device that scans a surface of a measured object using a detector provided with a contact pin and measures the surface texture (for example, roughness, undulation, or the like) of the measured object (see, e.g., Japanese Patent Laid-open Publication No. 2011-169616). Specifically, the contact pin is brought into contact with the surface of the measured object (XY plane in a rectangular coordinate system), and then the contact pin is displaced in an X axis direction, for example, and during this displacement the detector detects movement of the contact pin in a vertical direction (Z axis direction) caused by unevenness on the surface of the measured object. This movement is expressed as a function of a displacement distance in the X axis direction, thus enabling various parameters indicative of the surface texture to be recognized.

Because the contact of the contact pin on the surface of the measured object is based on gravity, the surface texture measuring device is designed on the assumption that the device will be used at a horizontal angle, and a specified measurement accuracy is ensured under that assumption.

However, in reality, small, hand-held surface texture measuring devices in particular are used in a variety of locations both indoor and outdoor, and are often used at non-horizontal angles. In such a case, in order to conduct an accurate measurement, a method is employed in which, for example, a calibration measurement is performed using a roughness standard specimen in the posture in which the measured object will actually be measured, and once a measurement error for that posture is recognized, the result of measuring the surface texture of the measured object is corrected using this information.

However, such a method requires an excessive amount of time to perform the calibration measurement, and such a method cannot even be used for environmental conditions where measurement using a roughness standard specimen is impossible.

In view of the above, a method may be considered where calibration measurements are conducted ahead of time for postures that may potentially be measured and correction values are stored, then an appropriate correction value for a measured posture is selected and applied at the site of measurement.

However, recognizing a measured posture at the site of measurement in the operator's own judgment demands a high level of skill and is not necessarily easy. Therefore, such a method is prone to several issues, such as an operator being unable to select the appropriate correction value, requiring a large amount of time to make a selection even when the operator is able to do so, or making a mistaken selection.

Given these circumstances, at present, in many cases an operator must accept measurement results without correction, even when a measurement is conducted at a non-horizontal angle.

SUMMARY OF THE INVENTION

The present invention provides a surface texture measuring device, a surface texture measuring system, and a program that are capable of both easily and rapidly correcting measurement results in cases where a surface texture measuring device is used at a non-horizontal angle.

A surface texture measuring device according to the present invention includes a surface texture detecting component that outputs measurement results for a surface texture of a measured object, where the measurement results are recognized as a change in the movement of a contact pin of a detector when tracing a surface of the measured object with the contact pin; a posture detecting sensor that detects a measured posture, which is a posture at the time of measurement by the detector; a memory component that is preloaded with correction values corresponding to each of a plurality of postures; and a correcting component that compares the measured posture with the plurality of postures stored in the memory component, and corrects the measurement results using a correction value that corresponds to a posture equivalent to the measured posture.

With such a configuration, the posture detecting sensor is used to detect the posture at the time of measuring the surface texture, and therefore the measured posture can be accurately identified. In addition, correction values corresponding to each of a plurality of postures can be preloaded, and therefore the correction value corresponding to a posture equivalent to the measured posture can be used and measurement results can be corrected both easily and rapidly.

The posture detecting sensor may also be mounted so as to be capable of being attached and detached. Specifically, an embodiment of a system can be suggested in which an external communication appliance such as a smart phone that includes the posture detecting sensor is used integrally as the posture detecting sensor of the surface texture measuring device of the present invention, for example.

According to this method, when the posture detecting sensor equipped on the external communication appliance is used based around a surface texture measuring device according to the conventional technology, particularly when the surface texture measuring device according to the conventional technology is already provided with communication functionality, the addition of other necessary functions can be achieved merely by modifying software, and therefore a system can be achieved in which an effect equivalent to that of the surface texture measuring device according to the present invention can be achieved at a lower cost.

A vibration detecting sensor that detects a magnitude of a vibration acting on the detector may be further provided, and the surface texture detecting component may be configured such that when the magnitude of the vibration acting on the detector during measurement of the surface texture exceeds a predetermined threshold value, the surface texture detecting component halts the measurement.

A property of the surface texture measuring device is to measure surface texture by tracing the surface of the measured object with the contact pin of the detector and detecting the change in the movement of the contact pin in a vertical direction during the tracing. When vibration acts on the detector during the measurement, this causes a change in the vertical-direction movement of the contact pin and leads to errors in the measurement results arising from the vibration of the detector. Given this, when vibration of the detector is detected and the magnitude of the vibration exceeds the predetermined threshold value, the measurement may be stopped, thereby excluding measurement results that include an error arising from the vibration of the detector.

The vibration detecting sensor may also be mounted so as to be capable of being attached and detached. Specifically, an embodiment of a system can be suggested in which an external communication appliance such as a smart phone that includes the vibration detecting sensor is used integrally as the vibration detecting sensor of the surface texture measuring device of the present invention, for example.

According to this method, when the vibration detecting sensor equipped on the external communication appliance is used based around a surface texture measuring device according to the conventional technology, particularly when the surface texture measuring device according to the conventional technology is already provided with communication functionality, the addition of other necessary functions can be achieved merely by modifying software, and therefore a system can be achieved in which an effect equivalent to that of the surface texture measuring device according to the present invention can be achieved at a lower cost.

A surface texture measuring system according to the present invention includes a surface texture measuring device that, upon receiving a command from an external communication appliance, transmits measurement results for a surface texture of a measured object to the external communication appliance, where the measurement results are recognized as a change in the movement of a contact pin of a detector when tracing a surface of the measured object with the contact pin; and an external communication appliance that is fastened to the surface texture measuring device. The external communication appliance includes a posture detecting sensor that detects a measured posture, which is a posture at the time of measurement by the detector; a memory component that is preloaded with correction values corresponding to each of a plurality of postures; a measurement control component that transmits a command to the surface texture measuring device requiring execution of a surface texture measurement and transmission of measurement results; and a correcting component that compares the measured posture with the plurality of postures stored in the memory component, and corrects the measurement results received from the surface texture measuring device using a correction value that corresponds to a posture equivalent to the measured posture.

With such a configuration, the posture detecting sensor is used to detect the posture at the time of measuring the surface texture, and therefore the measured posture can be accurately identified. In addition, correction values corresponding to each of a plurality of postures can be preloaded, and therefore the correction value corresponding to a posture equivalent to the measured posture can be used and measurement results can be corrected both easily and rapidly.

In addition, when the system is achieved based around the surface texture measuring device according to the conventional technology, by using the posture detecting sensor equipped on the external communication appliance, particularly when the surface texture measuring device according to the conventional technology is already provided with communication functionality, the addition of other necessary functions can be achieved merely by modifying software, and therefore an effect equivalent to that of the surface texture measuring device according to the present invention can be achieved at a lower cost.

The external communication appliance may further include a vibration detecting sensor that detects a magnitude of a vibration acting on the detector, and the measurement control component may be configured such that when the magnitude of the vibration acting on the detector during measurement of the surface texture exceeds a predetermined threshold value, the measurement control component transmits a command to the surface texture measuring device to halt the measurement.

A property of the surface texture measuring device is to measure surface texture by tracing the surface of the measured object with the contact pin of the detector and detecting the change in the movement of the contact pin in the vertical direction during the tracing. When vibration acts on the detector during the measurement, this causes a change in the vertical-direction movement of the contact pin and leads to errors in the measurement results arising from the vibration of the detector. Given this, when vibration of the detector is detected and the magnitude of the vibration exceeds a predetermined threshold value, the measurement may be stopped, thereby excluding measurement results that include an error arising from the vibration of the detector.

Functions of the measurement control component and the correcting component may also be described by a program, and may be achieved by executing the program on the external communication appliance, which is a computer.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Description of Functions

Figure 1:
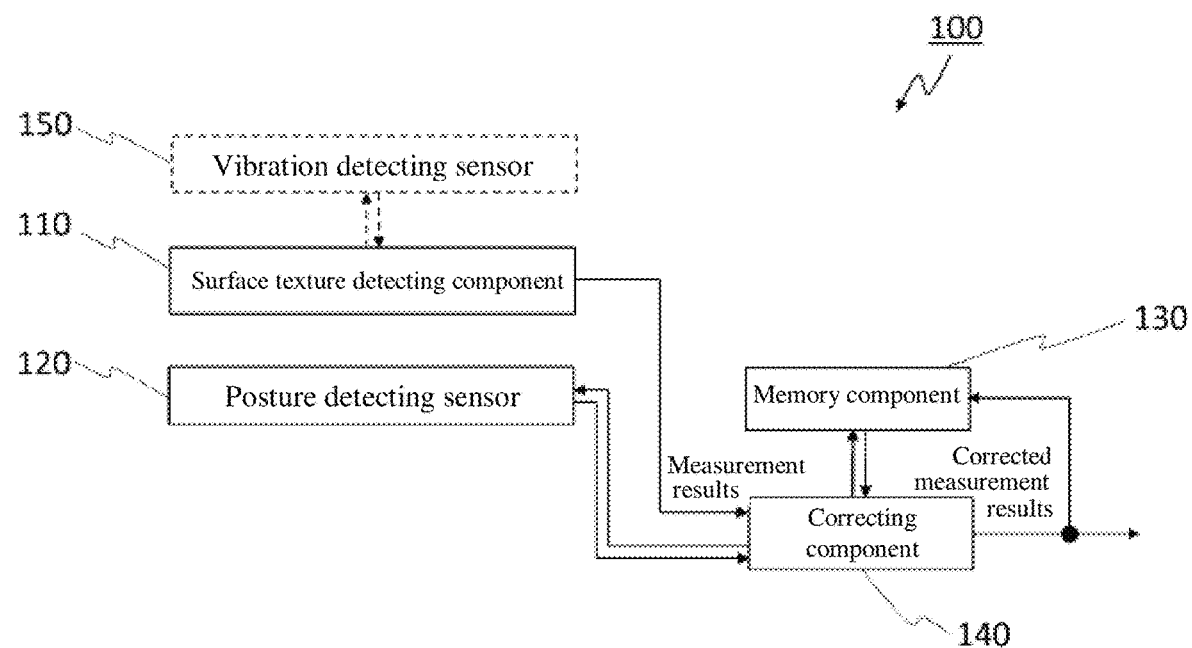
FIG. 1 is a functional block diagram of a surface texture measuring device 100.

FIG. 1 is a functional block diagram of a surface texture measuring device (surface texture measuring instrument) 100 according to the present invention.

The surface texture measuring device 100 includes a surface texture detecting component (surface texture detector) 110, a posture detecting sensor (posture detector or posture detection sensor) 120, a memory component (memory) 130, and a correcting component (correcting comparator) 140.

The surface texture detecting component 110 outputs measurement results for a surface texture of a measured object (measurable object), where the measurement results are recognized as a change in the movement of a contact pin of a detector when tracing a surface of the measured object with the contact pin.

The posture detecting sensor 120 detects a measured posture, which is a posture at the time of measurement by the detector. Here, "at the time of measurement" essentially signifies "during measurement," but when there is no significant change in posture before and after the measurement, the term may also include periods before and after measurement insofar as there is no change in posture. Any type of posture detecting sensor 120 may be used. A gyrosensor is a favorable example of the posture detecting sensor 120.

The memory component 130 is preloaded with correction values corresponding to each of a plurality of postures. For example, the correction value for each posture can be acquired as an error recognized by performing a surface texture measurement in various postures ahead of time using a roughness standard specimen as the measured object and comparing the measurement results with design values for the roughness standard specimen.

Readying the memory component 130 with correction values that correspond to as many postures as possible is preferable from a perspective of increasing correction accuracy. However, measuring the roughness standard specimen in each posture requires a certain amount of time and effort, and so in reality the correction value for each posture is added on a running basis.

The surface texture measuring device 100 of the present invention includes the posture detecting sensor 120, and therefore a novel posture can be accurately recognized when performing measurement in the novel posture. Therefore, by repeating a task of calculating a correction value based on the measurement results for the surface texture of the roughness standard specimen in the novel posture and storing the calculation result in the memory component 130, the variety of postures can be enhanced.

The correcting component 140 compares a measured posture detected by the posture detecting sensor 120 with the plurality of postures stored in the memory component 130, and when the memory component 130 contains a correction value that corresponds to a posture equivalent to the measured posture, the correcting component 140 corrects the measurement results using the correction value.

Here, "a posture equivalent to the measured posture" signifies a given posture stored in the memory component 130 in a case where, when the measured posture detected by the posture detecting sensor 120 is compared with the plurality of postures stored in the memory component 130, a difference in posture between the measured posture and the given posture is within a predetermined range.

Ideally, when performing correction with correction values that are prepared ahead of time, a correction value can be prepared for any conceivable posture. However, in reality, preparing postures that perfectly match measured postures is extremely difficult, whereas when the correction value for a posture close to the measured posture is applied, an improvement in measurement accuracy can be reasonably expected.

The predetermined range for the difference in posture associated with a range of applicability for the correction value may be defined as desired. For example, the fewer the number of postures having a ready correction value, the more broadly the predetermined range for each posture is defined. Of course, when the range is set so broadly, the correction value is no longer necessarily an optimal value, which leads to a reduced improvement in measurement accuracy. Given this, there may, for example, be correspondences that preserve the improvement in measurement accuracy in cases where a posture equivalent to the measured posture exists, without needing to define a broad range even when the number of postures having a ready correction value is low, whereas an operator must accept that circumstances do not allow for correction in cases where a posture equivalent to the measured posture does not exist.

The corrected measurement results may be stored in the memory component 130 together with the measured posture, for example.

When there is no posture equivalent to the measured posture and correction is not performed, the measurement results may be discarded, or the uncorrected measurement results may be stored in the memory component 130 together with the measured posture. By storing the measurement results with the measured posture even when correction is impossible, uncorrected measurement results for each measured posture can be compared, and when a correction value for that measured posture is provided later, the uncorrected measurement results stored in the memory component 130 can be corrected by the new correction value.

The surface texture measuring device 100 described above uses a posture detecting sensor to detect a posture at the time of measuring the surface texture, and therefore can accurately identify a measured posture. In addition, the surface texture measuring device 100 is preloaded with correction values corresponding to each of a plurality of postures, and therefore can use the correction value corresponding to a posture equivalent to the measured posture and can both easily and rapidly correct measurement results.

The surface texture measuring device 100 may further include a vibration detecting sensor (vibration detector or vibration detection sensor) 150 that detects a magnitude of a vibration acting on the detector, and may be configured such that when the magnitude of the vibration acting on the detector during measurement of the surface texture exceeds a predetermined threshold value, the surface texture detecting component 110 halts the measurement. Any type of vibration detecting sensor 150 may be used. An accelerometer is a favorable example of the vibration detecting sensor 150.

A property of the surface texture measuring device 100 is to measure surface texture by tracing the surface of the measured object with the contact pin of the detector and detecting the change in the movement of the contact pin in a vertical direction during the tracing. When vibration acts on the detector during the measurement, this causes a change in the vertical-direction movement of the contact pin and leads to errors in the measurement results arising from the vibration of the detector. Given this, when vibration of the detector is detected and the magnitude of the vibration exceeds a predetermined threshold value, the measurement may be stopped, thereby excluding measurement results that include an error arising from the vibration of the detector.

The posture detecting sensor 120 and the vibration detecting sensor 150 do not necessarily need to be provided as separate components, and can instead leverage a single sensor having the functions of both.

Method of Implementing Functions in Actual Appliance

The surface texture measuring device 100 according to the present invention can be achieved by incorporating the modifications described below in a conventional surface texture measuring device (surface texture measuring instrument) 800.

Figure 2:
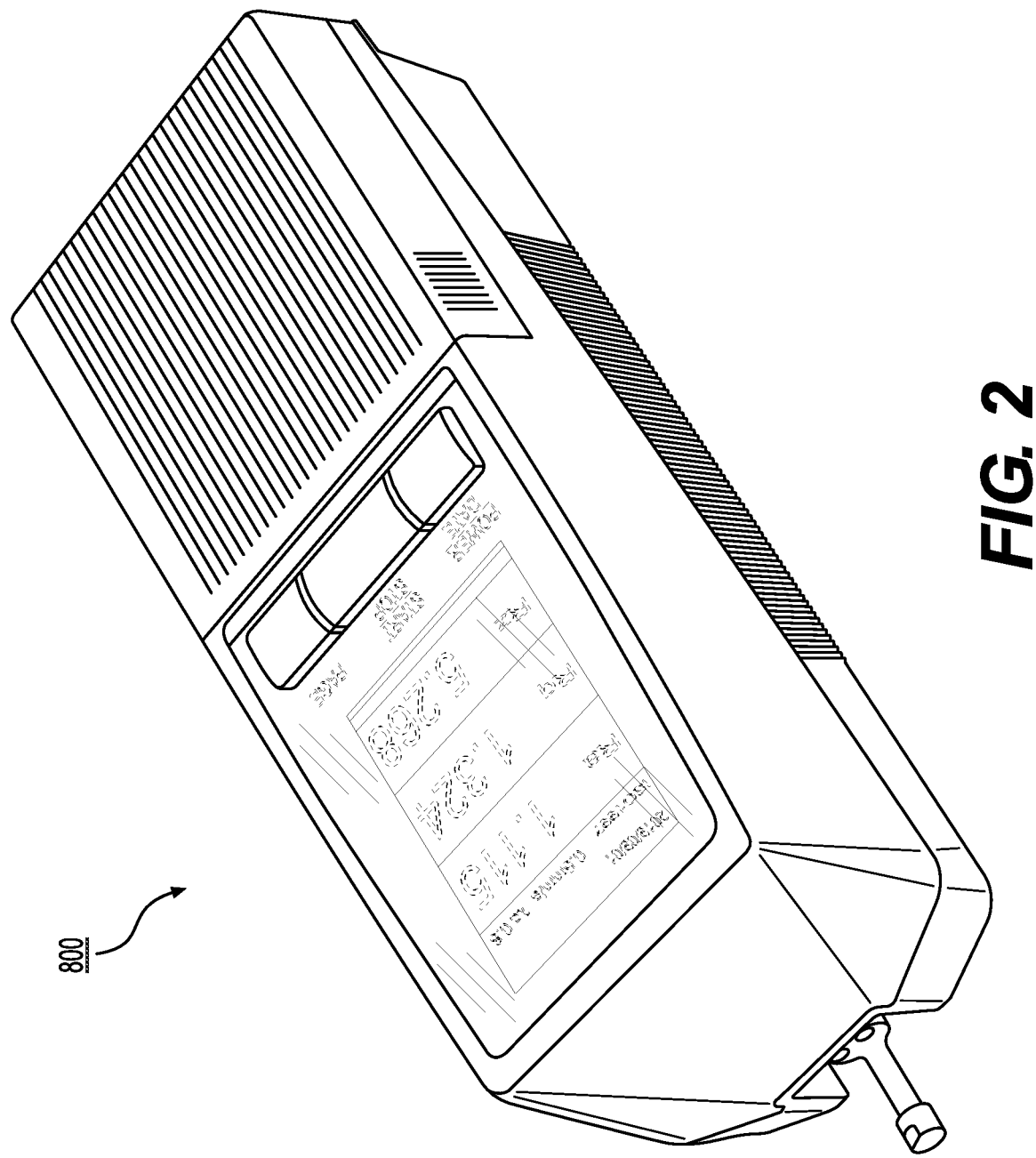
FIG. 2 illustrates an exemplary exterior view of a surface texture measuring device 100 (and 800)
Figure 3:
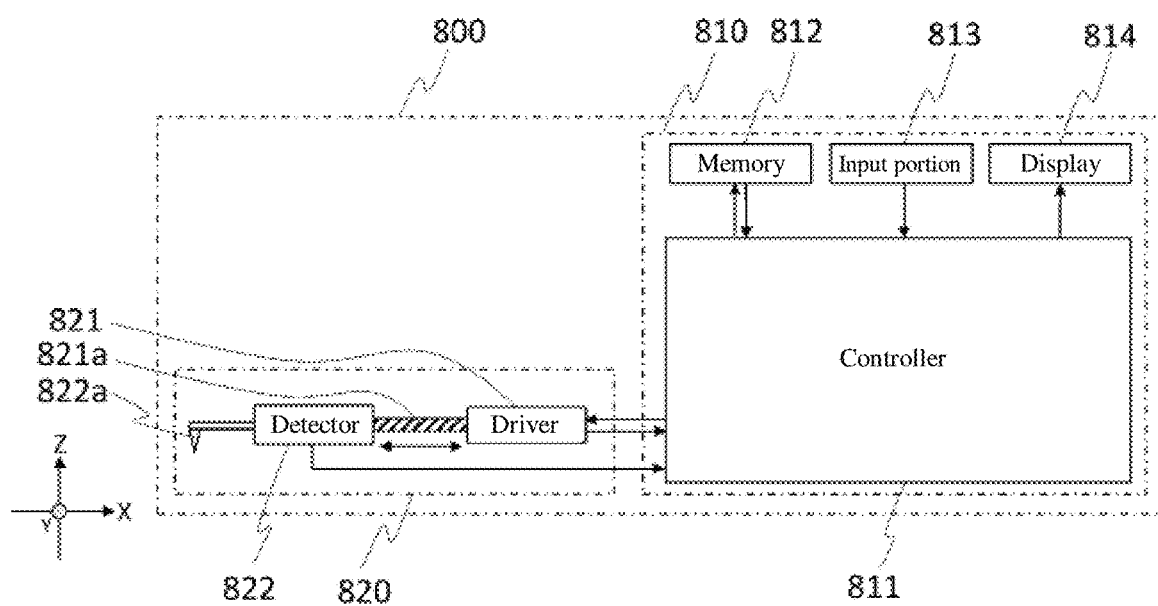
FIG. 3 illustrates an exemplary internal configuration of the surface texture measuring device 800.

First, a description is given of the conventional surface texture measuring device 800. FIG. 2 illustrates an exemplary exterior view of the conventional surface texture measuring device 800, and FIG. 3 illustrates an exemplary internal configuration of the same.

The surface texture measuring device 800 includes a calculator 810, and a drive detection portion (drive detector) 820 that detects the surface texture of the measured object and supplies detection information to the calculator 810.

The calculator 810 includes a controller 811, a memory 812, an input portion 813, and a display 814.

The controller 811 is typically a central processing unit (CPU) and controls various components by executing various programs. The memory 812 is typically a random access memory (RAM) or hard disk drive (HDD). RAM is primarily used as a work space for the controller 811 and the HDD is primarily used as a storage space for various programs or data. The input portion (input) 813 is an input component that receives input of information related to the measurement from the operator. A button or touchscreen display panel, for example, may be used as the input portion 813. The display 814 is a display component that displays measurement results or the like. A generic liquid crystal display panel or touchscreen display panel, for example, may be used as the display 814. An output portion (output) such as a printer may also be provided in addition to or in place of the display 814.

The drive detection portion 820 includes a driver 821 provided with a drive shaft 821a, and a detector 822 provided with a contact pin 822a.

The driver 821 holds a second end of the drive shaft 821a, the first end of which is fixated to the detection device 822, and drives the drive shaft 821a in an X axis direction illustrated in FIG. 2. Thereby, the driver 821 displaces the detector 822 in the X axis direction, and also supplies a displacement distance in the X axis direction to the controller 811. The contact pin 822a is mounted to the foremost end of the detector 822. In a state where the contact pin 822a is in contact with the surface of the measured object, which lies on the XY plane, the driver 821 displaces in the X axis direction, thereby successively generating movement of the contact pin 822a in a Z axis direction, which the detector 822 supplies to the controller 811.

In the surface texture measuring device 800 having this configuration, a surface texture detection program is preloaded in the memory 812, the program being written with control content in which, based on a measurement instruction input from the input portion 813, the driver 821 is driven and the detector 822, which is in a state where the contact pin 822a is in contact with the surface of the measured object, is displaced in the X axis direction and the displacement distance in the X axis direction is successively acquired from the driver 821, and in addition, movement of the contact pin 822a in the Z axis direction, which corresponds to the current position of the driver 821, is successively acquired from the detector 822, and these measurement results are stored in the memory 812. When storing the displacement distance in the X axis direction and the movement in the Z axis direction in the memory 812, the movement in the Z axis direction may be stored as a function of the displacement distance in the X axis direction, for example.

The controller 811 reads and executes the surface texture detection program, and thereby performs control described in the program on each component.

Figure 4:
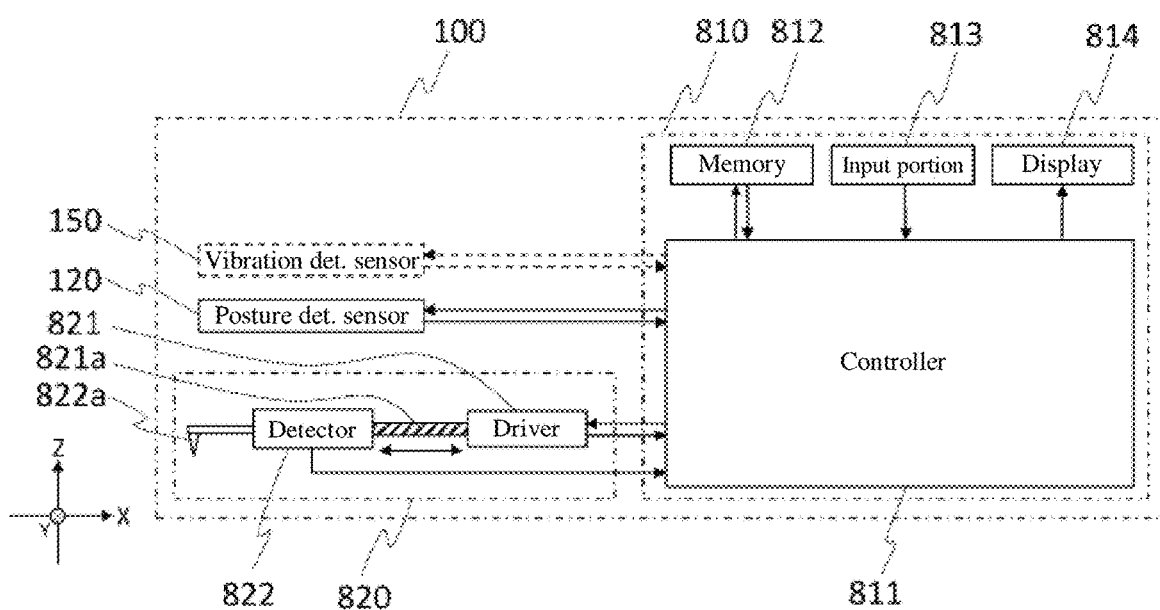
FIG. 4 illustrates an exemplary internal configuration of the surface texture measuring device 100.
Figure 5:
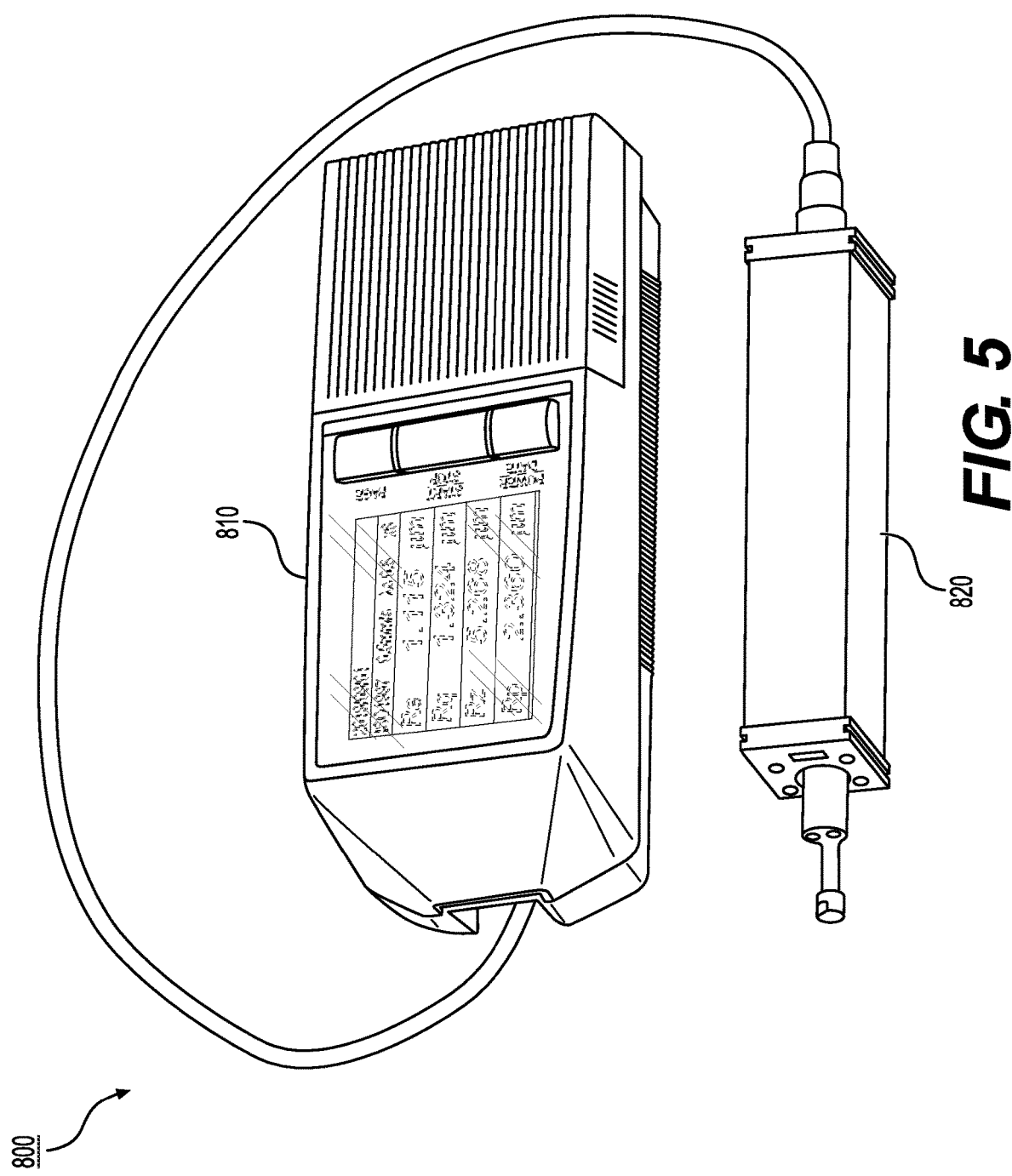
FIG. 5 illustrates an example in which a calculator 810 and a drive detection portion 820 are separate.

In contrast, FIG. 4 illustrates an exemplary internal configuration of the surface texture measuring device 100 according to the present invention. The surface texture measuring device 100 has a configuration in which the posture detecting sensor 120 is added to the surface texture measuring device 800. When the calculator 810 and the drive detection portion 820 of the surface texture measuring device 100 are not integrated as illustrated in FIG. 2, but rather are provided separately as illustrated in FIG. 5, or are able to be separated, the posture detecting sensor 120 must be mounted on the drive detection portion 820, to which the detector 822 is provided.

The memory 812 of the surface texture measuring device 100 illustrated in FIG. 4 is equivalent to the memory component 130 of the functional block diagram illustrated in FIG. 1, and is preloaded with correction values corresponding to each of a plurality of postures.

In addition, a surface texture detection program similar to that of the surface texture measuring device 800 and a measured posture acquisition program are preloaded in the memory 812, the measured posture acquisition program being written with control content which, during execution of the surface texture detecting program, causes a command to be sent to the posture detecting sensor 120 requiring that the measured posture be supplied, and causes a measured posture supplied in response to the command to be stored in the memory 812.

The controller 811 reads and executes each program, and thereby performs control described in the program applicable to each component, thereby achieving the functions of the surface texture detecting component 110 in the functional block diagram of FIG. 1.

When storing the surface texture measurement results and the measured posture from the time of the measurement in the memory 812, the two are associated with each other and are stored based on the description of one of the surface texture detection program and the measured posture acquisition program.

Moreover, a correction program is preloaded in the memory 812, the program being written with control content in which a measured posture detected by the posture detecting sensor 120 is compared with the plurality of postures preloaded in the memory component 130, and when the memory component 130 contains a correction value that corresponds to a posture equivalent to the measured posture, the measurement results are corrected using the correction value and the corrected measurement results are stored in the memory 812 together with the measured posture.

The controller 811 reads and executes the correction program, and thereby performs control described in the program on each component, thereby achieving the functions of the correcting component 140 in the functional block diagram of FIG. 1.

When the vibration detecting sensor 150 is added to the surface texture measuring device 800 to configure the surface texture measuring device 100 that is capable of executing control to stop when vibration occurs, the memory 812 is further preloaded with a vibration detection program; the program being written with control content such that the program stands by for a signal indicating that vibration is detected to be input from the vibration detecting sensor 150, and identifies the magnitude of the vibration based on the signal when the signal is input, the program also determining whether the vibration is greater than a predetermined magnitude and, when greater, causing execution of the surface texture detection program to stop.

The controller 811 reads and executes the vibration detection program, and thereby performs control described in the program on each component, thereby achieving the functions of the correcting component 140 in the functional block diagram of FIG. 1.

Also, when the calculator 810 and the drive detection portion 820 of the surface texture measuring device 100 are not integrated as illustrated in FIG. 2, but rather are provided separately as illustrated in FIG. 5, or are able to be separated, the vibration detecting sensor 150 must be mounted on the drive detection portion 820, to which the detector 822 is provided.

Second Embodiment

The surface texture measuring device 100 according to the present invention may be achieved by adding new functions to the conventional surface texture measuring device 800. Meanwhile, a surface texture measuring system 300 according to the present invention is a system that enables effects equivalent to those of the surface texture measuring device 100 according to the present invention to be achieved more economically using a surface texture measuring system based around the conventional surface texture measuring device 800 and implementing a majority of the new functionality with an external communication appliance.

Description of Functions

Figure 6:
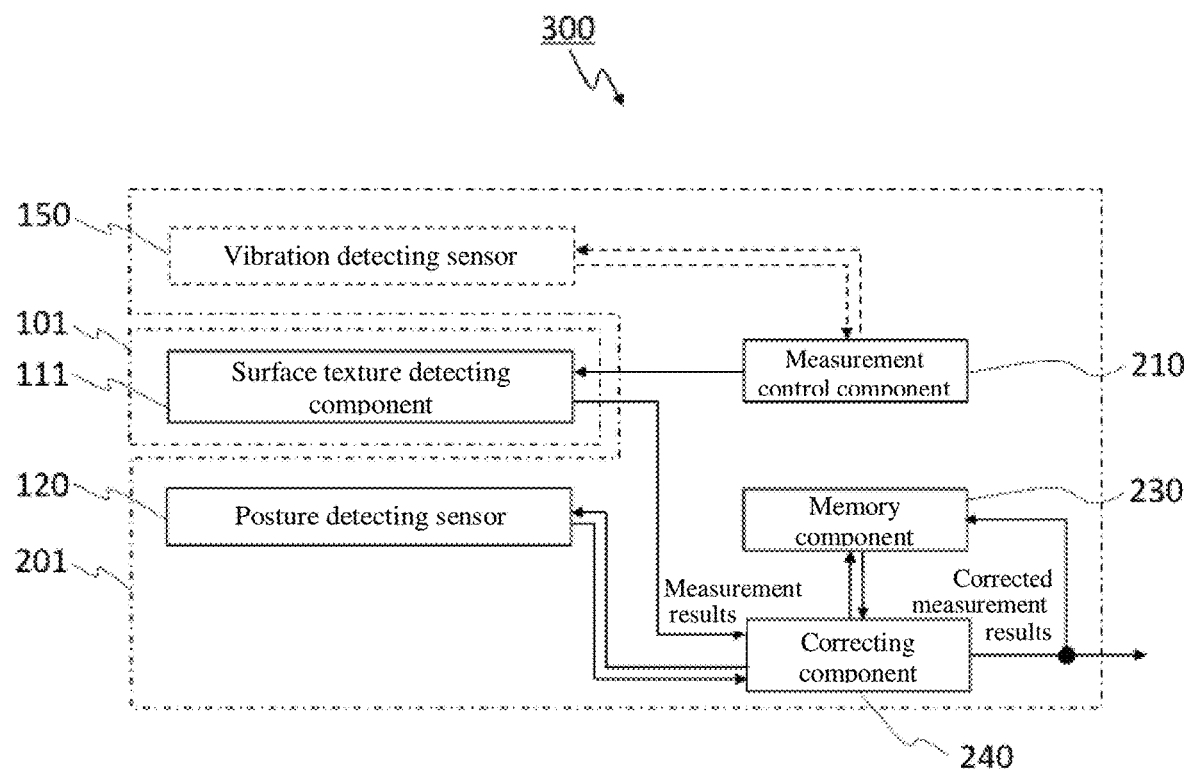
FIG. 6 is a functional block diagram of a surface texture measuring system 300.

FIG. 6 is a functional block diagram of the surface texture measuring system 300 according to the present invention.

The surface texture measuring system 300 includes a surface texture measuring device (surface texture measuring instrument) 101 and an external communication appliance (external communication interface) 201 that is fastened to the surface texture measuring device 101.

The surface texture measuring device 101 includes a surface texture detecting component 111 that, upon receiving a command from the external communication appliance 201, transmits measurement results for a surface texture of a measured object to the external communication appliance 201, where the measurement results are recognized as a change in the movement of a contact pin of a detector when tracing a surface of the measured object with the contact pin.

The external communication appliance 201 includes a measurement control component 210, the posture detecting sensor 120, a memory component 230, and a correcting component 240.

The measurement control component 210 transmits a command to the surface texture measuring device 101 requiring execution of a surface texture measurement and transmission of measurement results.

The posture detecting sensor 120 detects a measured posture, which is a posture at the time of measurement by the detector. Here, "at the time of measurement" essentially signifies "during measurement," but when there is no significant change in posture before and after the measurement, the term may also include periods before and after measurement insofar as there is no change in posture. Any type of posture detecting sensor 120 may be used. A gyrosensor is a favorable example of the posture detecting sensor 120.

The memory component 230 is preloaded with correction values corresponding to each of a plurality of postures. For example, the correction value for each posture can be acquired as an error recognized by performing a surface texture measurement in various postures ahead of time using a roughness standard specimen as the measured object and comparing the measurement results with design values for the roughness standard specimen.

Readying the memory component 230 with correction values that correspond to as many postures as possible is preferable from a perspective of increasing correction accuracy. However, measuring the roughness standard specimen in each posture requires a certain amount of time and effort, and so in reality the correction value for each posture is added on a running basis.

The surface texture measuring system 300 of the present invention includes the posture detecting sensor 120, and therefore a novel posture can be accurately recognized when performing measurement in the novel posture. Therefore, by repeating a task of calculating a correction value based on the measurement results for the surface texture of the roughness standard specimen in the novel posture and storing the calculation result in the memory component 230, the variety of postures can be enhanced.

The correcting component 240 compares a measured posture detected by the posture detecting sensor 120 with the plurality of postures stored in the memory component 230, and when the memory component 230 contains a correction value that corresponds to a posture equivalent to the measured posture, the correcting component 240 corrects the measurement results using the correction value.

Here, "a posture equivalent to the measured posture" signifies a given posture stored in the memory component 230 in a case where, when the measured posture detected by the posture detecting sensor 120 is compared with the plurality of postures stored in the memory component 230, a difference in posture between the measured posture and the given posture is within a predetermined range.

Ideally, when performing correction with correction values that are prepared ahead of time, a correction value can be prepared for any conceivable posture. However, in reality, preparing postures that perfectly match measured postures is extremely difficult, whereas when the correction value for a posture close to the measured posture is applied, an improvement in measurement accuracy can be reasonably expected.

The predetermined range for the difference in posture associated with a range of applicability for the correction value may be defined as desired. For example, the fewer the number of postures having a ready correction value, the more broadly the predetermined range for each posture is defined. Of course, when the range is set so broadly, the correction value is no longer necessarily an optimal value, which leads to a reduced improvement in measurement accuracy. Given this, there may, for example, be correspondences that preserve the improvement in measurement accuracy in cases where a posture equivalent to the measured posture exists, without needing to define a broad range even when the number of postures having a ready correction value is low, whereas an operator must accept that circumstances do not allow for correction in cases where a posture equivalent to the measured posture does not exist.

The corrected measurement results may be stored in the memory component 230 together with the measured posture, for example.

When there is no posture equivalent to the measured posture and correction is impossible, the measurement results may be discarded, or the uncorrected measurement results may be stored in the memory component 230 together with the measured posture. By storing the measurement results with the measured posture even when correction is impossible, uncorrected measurement results for each measured posture can be compared, and when a correction value for that measured posture is provided later, the uncorrected measurement results stored in the memory component 230 can be corrected by the new correction value.

The surface texture measuring system 300 described above uses the posture detecting sensor 120 to detect a posture at the time of measuring the surface texture, and therefore can accurately identify a measured posture. In addition, the surface texture measuring system 300 is preloaded with correction values corresponding to each of a plurality of postures, and therefore can use the correction value corresponding to a posture equivalent to the measured posture and both easily and rapidly correct measurement results.

In addition, when the surface texture measuring system 300 is achieved based around the surface texture measuring device 800 according to the conventional technology, by using the posture detecting sensor 120 equipped on the external communication appliance 201, particularly when the surface texture measuring device 800 according to the conventional technology is already provided with communication functionality, the addition of other necessary functions can be achieved merely by modifying software, and therefore an effect equivalent to that of the surface texture measuring device 100 according to the present invention can be achieved at a lower cost.

In the surface texture measuring system 300, the external communication appliance 201 may further include the vibration detecting sensor 150 that detects the magnitude of a vibration acting on the detector of the surface texture detecting component 111, and may be configured such that when the magnitude of the vibration acting on the detector during measurement of the surface texture exceeds a predetermined threshold value, the surface texture detecting component 111 halts the measurement. Any type of vibration detecting sensor 150 may be used. An accelerometer is a favorable example of the vibration detecting sensor 150.

A property of the surface texture detecting component 111 is to measure surface texture by tracing the surface of the measured object with the contact pin of the detector and detecting the change in the movement of the contact pin in the vertical direction during the tracing. When vibration acts on the detector during the measurement, this causes a change in the vertical-direction movement of the contact pin and leads to errors in the measurement results arising from the vibration of the detector. Given this, when vibration of the detector is detected and the magnitude of the vibration exceeds a predetermined threshold value, the measurement may be stopped, thereby excluding measurement results that include an error arising from the vibration of the detector.

The posture detecting sensor 120 and the vibration detecting sensor 150 do not necessarily need to be provided as separate components, and can instead leverage a single sensor having the functions of both.

Method of Implementing Functions in Actual Appliance

The surface texture measuring system 300 according to the present invention can be achieved by combining the surface texture measuring device 101, which incorporates the modifications described below in the conventional surface texture measuring device 800 illustrated in FIG. 3, with the external communication appliance 201 having the configuration described below.

Figure 7:
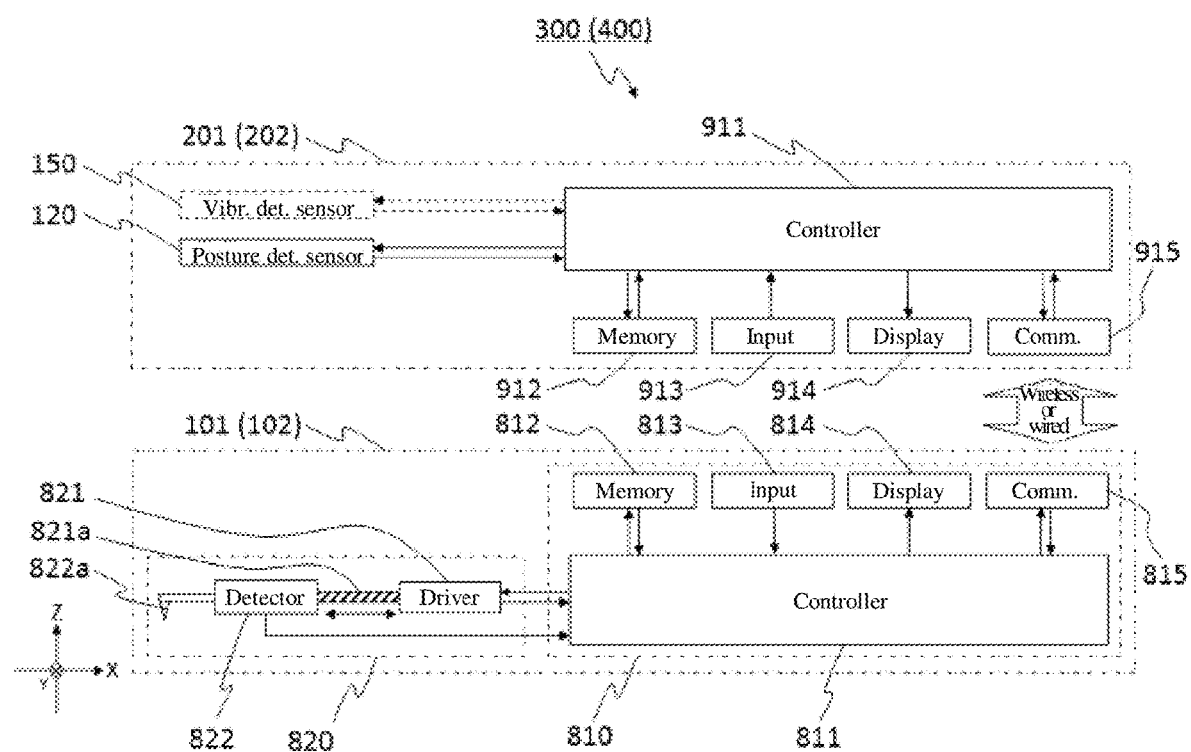
FIG. 7 illustrates exemplary internal configurations of a surface texture measuring device and an external communication appliance configuring the surface texture measuring system 300 (and 400)

FIG. 7 illustrates exemplary internal configurations of the surface texture measuring device 101 and the external communication appliance 201 configuring the surface texture measuring system 300.

The surface texture measuring device 101 includes the calculator 810, and the drive detection portion 820 that detects the surface texture of the measured object and supplies detection information to the calculator 810.

The calculator 810 includes the controller 811, the memory 812, the input portion 813, the display 814, and a communication portion 815. Of these, the functionality of each portion other than the communication portion 815 is similar to the functionality of each portion assigned the same reference numeral in the description of the conventional surface texture measuring device 800 illustrated in FIG. 3, and therefore a description thereof is omitted.

The communication portion 815 receives a command transmitted from the external communication appliance 201 and supplies the command to the controller 811, and also transmits processing results of the controller 811 to the external communication appliance 201. The communication portion 815 may use any communication format, which may be either wired or wireless without prejudice.

The drive detection portion 820 includes the driver 821 provided with the drive shaft 821a, and the detector 822 provided with the contact pin 822a. The functionality of each of these is the same as the functionality of the drive detection portion 820 of the conventional surface texture measuring device 800 illustrated in FIG. 3, and therefore a description thereof is omitted.

In the surface texture measuring device 101 having this configuration, a surface texture detection program is preloaded in the memory 812, the program being written with control content in which, upon receipt of a measurement execution command from the external communication appliance 201, the driver 821 is driven and the detector 822, which is in a state where the contact pin 822a is in contact with the surface of the measured object, is displaced in the X axis direction and the displacement distance in the X axis direction is successively acquired from the driver 821, and in addition, movement of the contact pin 822a in the Z axis direction, which corresponds to the current position of the driver 821, is successively acquired from the detector 822, and these measurement results are transmitted to the external communication appliance 201. When transmitting the measurement results to the external communication appliance 201, the movement in the Z axis direction may be transmitted as a function of the displacement distance in the X axis direction, in a form associating the two.

The controller 811 reads and executes the surface texture detection program, and thereby performs control described in the program on each component, thereby achieving the functions of the surface texture detecting component 111 in the functional block diagram of FIG. 6.

Meanwhile, the external communication appliance 201 includes a controller 911, a memory 912, an input portion 913, a display 914, a communication portion 915, and the posture detecting sensor 120. When the external communication appliance 201 is an appliance that is either directly or incidentally provided with these functions, any communication appliance may be used, such as a smart phone.

However, because the posture of the surface texture measuring device 101 must be detected by the posture detecting sensor 120, which is provided to the external communication appliance 201, the external communication appliance 201 must be an appliance that can be fastened to the surface, texture measuring device 101.

Figure 8:
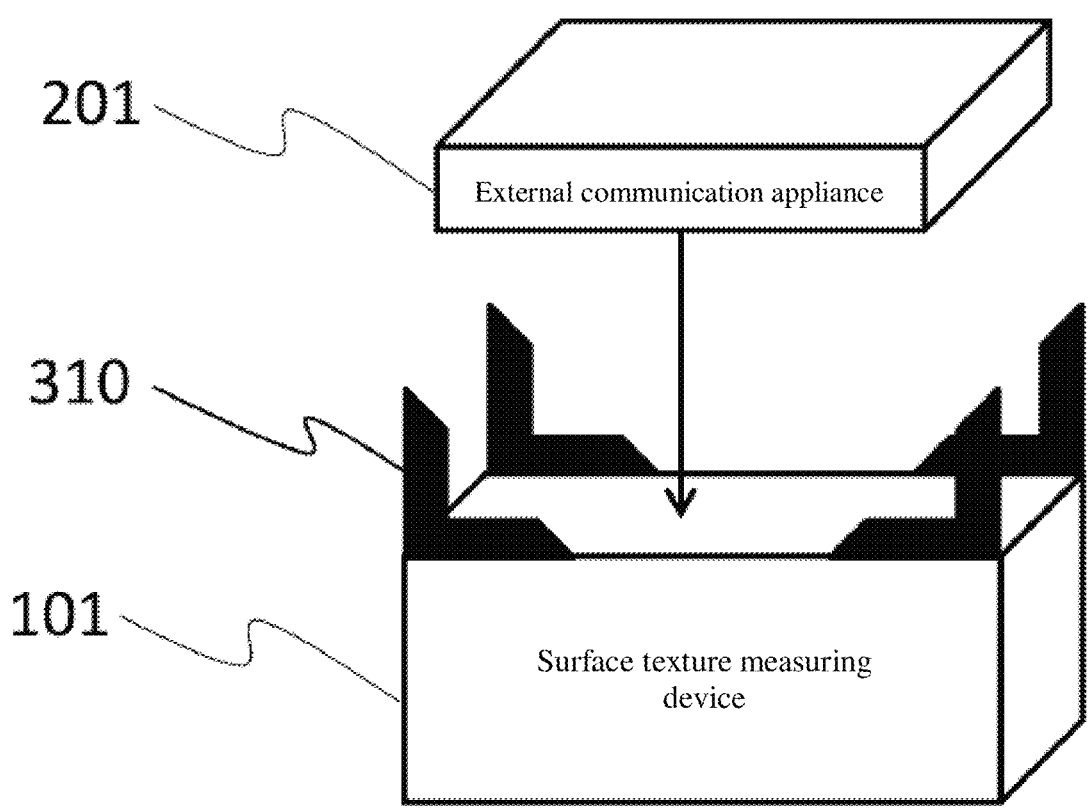
FIG. 8 illustrates an exemplary method of fixating an external communication appliance 201 to a surface texture measuring device 101 via a fastener 310.

Any method of fastening the external communication appliance 201 on the surface texture measuring device 101 can be used. For example, as illustrated in FIG. 8, the surface texture measuring device 101 may further include a fastener 310, which may be used to fasten the external communication appliance 201. Also, the external communication appliance 201 may further include the fastener 310, which may be used to fasten the external communication appliance 201. Furthermore, separate fasteners 310 for each of the surface texture measuring device 101 and the external communication appliance 201 may be used to fasten the external communication appliance 201.

Also, when the calculator 810 and the drive detection portion 820 of the surface texture measuring device 101 are not integrated as illustrated in FIG. 2, but rather are provided separately as illustrated in FIG. 5, or are able to be separated, the external communication appliance 201 must be fastened to the drive detection portion 820, to which the detector 822 is provided.

The controller 911 is typically a central processing unit (CPU) and controls various components by executing various programs. The memory 912 is typically a random access memory (RAM) or hard disk drive (HDD). RAM is primarily used as a work space for the controller 911 and the HDD is primarily used as a storage space for various programs or data. The input portion 913 is an input component that receives input of information related to the measurement from the operator. A button or touchscreen display panel, for example, may be used as the input portion 913. The display 914 is a display component that displays measurement results or the like. A generic liquid crystal display panel or touchscreen display panel, for example, may be used as the display 914. An output portion such as a printer (not shown in the drawings) may also be provided in addition to or in place of the display 914. The communication portion 915 transmits a command to the surface texture measuring device 101 based on control executed by the controller 911, and also receives a response from the surface texture measuring device 101 and supplies the response to the controller 911. The communication format used by the communication portion 915 is a format that can communicate with the communication portion 815.

The memory 912 of the external communication appliance 201 illustrated in FIG. 7 is equivalent to the memory component 230 of the functional block diagram illustrated in FIG. 6, and is preloaded with correction values corresponding to each of a plurality of postures.

In addition, a measurement control program is further preloaded in the memory 912, the program being written with control content in which, based on a measurement instruction input from the input portion 913, a command is sent to the surface texture measuring device 101 requiring execution of a surface texture measurement and transmission of measurement results, and causing the measurement results supplied from the surface texture measuring device 101 to be stored in the memory 912. A measurement control program is also preloaded in the memory 912, the program being written with control content in which a command is sent to the posture detecting sensor 120 requiring that the measured posture be supplied, and causing the measured posture supplied by the posture detecting sensor 120 to be stored in the memory 912.

The controller 911 reads and executes each program, and thereby performs control described in the program on each component, thereby achieving the functions of the measurement control component 210 in the functional block diagram of FIG. 6.

When storing the surface texture measurement results and the measured posture from the time of the measurement in the memory 912, the two are associated with each other and are stored based on the description of one of the surface texture detection program and the measured posture acquisition program.

Moreover, a correction program is preloaded in the memory 912, the program being written with control content in which a measured posture detected by the posture detecting sensor 120 is compared with the plurality of postures preloaded in the memory component 230, and when the memory component 230 contains a correction value that corresponds to a posture equivalent to the measured posture, the measurement results are corrected using the correction value and the corrected measurement results are stored in the memory 912 together with the measured posture.

The controller 911 reads and executes the correction program, and thereby performs control described in the program on each component, thereby achieving the functions of the correcting component 240 in the functional block diagram of FIG. 6.

When the vibration detecting sensor 150 is added to the external communication appliance 201 to configure the surface texture measuring system 300 that is capable of executing control to stop when vibration occurs, the memory 912 is further preloaded with a vibration detection program, the program being written with control content such that the program stands by for a signal indicating that vibration is detected to be input from the vibration detecting sensor 150, and identifies the magnitude of the vibration based on the signal when the signal is input, the program also determining whether the vibration is greater than a predetermined magnitude and, when greater, causing execution of the surface texture detection program to stop.

The controller 911 reads and executes the vibration detection program, and thereby performs control described in the program on each component.

Also, when the calculator 810 and the drive detection portion 820 of the surface texture measuring device 101 are not integrated as illustrated in FIG. 2, but rather are provided separately as illustrated in FIG. 5, or are able to be separated, the vibration detecting sensor 150 must be mounted on the drive detection portion 820, to which the detector 822 is provided.

Third Embodiment

A surface texture measuring system 400 according to a third embodiment is a system that enables effects equivalent to those of the surface texture measuring device 100 according to the present invention to be achieved more economically using a surface texture measuring system based around the conventional surface texture measuring device 800 and implementing only a posture detecting sensor (and vibration detecting sensor) with an external communication appliance. A difference with respect to the second embodiment is that in the surface texture measuring system 300 according to the second embodiment, measurement control is carried out from the external communication appliance, whereas in the surface texture measuring system 400 according to the present embodiment, measurement control is carried out by a surface texture measuring device, similar to the surface texture measuring device 100 according to the first embodiment. Also, with respect to differences from the first embodiment, the present embodiment differs in that the posture detecting sensor (and vibration detecting sensor) can be attached and detached in a practical way.

Description of Functions

Figure 9:
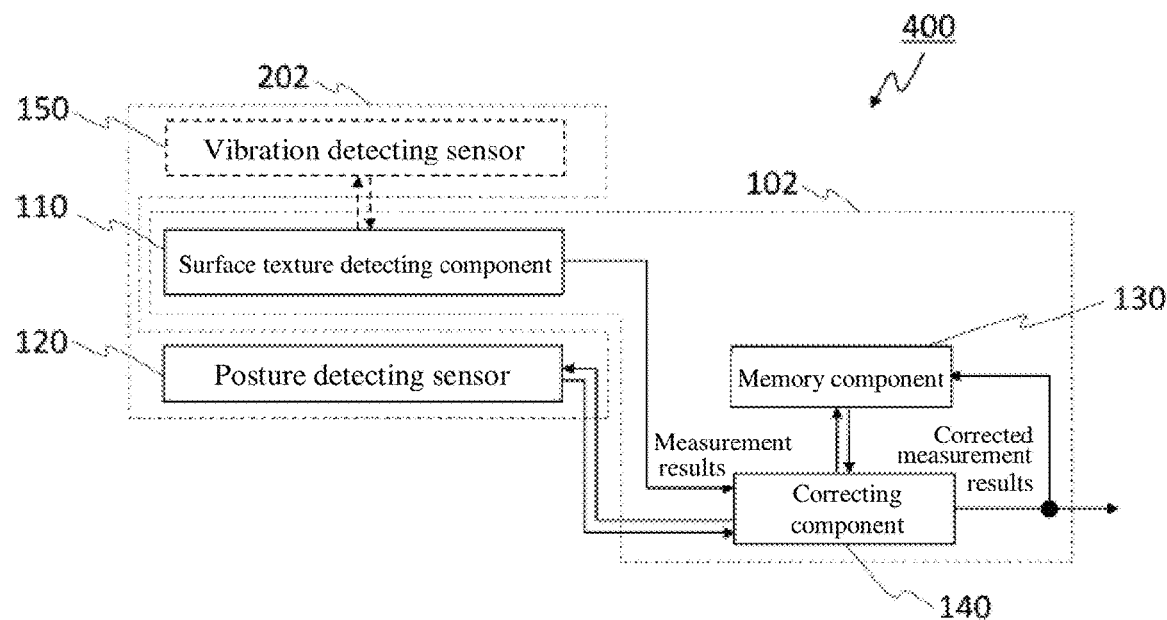
FIG. 9 is a functional block diagram of the surface texture measuring system 400.

FIG. 9 is a functional block diagram of the surface texture measuring system 400 according to the present invention.

The surface texture measuring system 400 includes a surface texture measuring device 102 and an external communication appliance 202 that is fastened to the surface texture measuring device 102.

The surface texture measuring device 102 includes the surface texture detecting component 110, the memory component 130, and the correcting component 140. Specifically, the surface texture measuring device 102 has a configuration that omits the posture detecting sensor 120 from the surface texture measuring device 100 illustrated in FIG. 1. Functions of each component are similar to those in the surface texture measuring device 100, and therefore a description thereof is omitted.

The external communication appliance 202 includes at least the posture detecting sensor 120. Functions of the posture detecting sensor 120 are similar to those in the surface texture measuring device 100, and therefore a description thereof is omitted.

The surface texture measuring system 400 described above uses the posture detecting sensor 120 to detect a posture at the time of measuring the surface texture, and therefore can accurately identify a measured posture. In addition, the surface texture measuring system 400 is preloaded with correction values corresponding to each of a plurality of postures, and therefore can use the correction value corresponding to a posture equivalent to the measured posture and both easily and rapidly correct measurement results.

In addition, when the surface texture measuring system 400 is achieved based around the surface texture measuring device 800 according to the conventional technology, by using the posture detecting sensor 120 equipped on the external communication appliance 202, particularly when the surface texture measuring device 800 according to the conventional technology is already provided with communication functionality, the addition of other necessary functions can be achieved merely by modifying software, and therefore an effect equivalent to that of the surface texture measuring device 100 according to the present invention can be achieved at a lower cost.

In the surface texture measuring system 400, the external communication appliance 202 may further include the vibration detecting sensor 150 that detects the magnitude of a vibration acting on the detector of the surface texture detecting component 110. Functions of the vibration detecting sensor 150 are similar to those in the surface texture measuring device 100, and therefore a description thereof is omitted.

The surface texture measuring system 400 further includes the vibration detecting sensor 150 and is configured to halt measurement when the magnitude of the detected vibration of the detector exceeds the predetermined threshold value, thereby excluding measurement results that include an error arising from the vibration of the detector itself.

The posture detecting sensor 120 and the vibration detecting sensor 150 do not necessarily need to be provided as separate components, and can instead leverage a single sensor having the functions of both.

Method of Implementing Functions in Actual Appliance

The surface texture measuring system 400 according to the present invention can be achieved by combining the surface texture measuring device 102, which incorporates the modifications described below in the conventional surface texture measuring device 800 illustrated in FIG. 3, with the external communication appliance 202 having the configuration described below.

FIG. 7 illustrates exemplary internal configurations of the surface texture measuring device 102 and the external communication appliance 202 configuring the surface texture measuring system 400.

The surface texture measuring device 102 includes the calculator 810, and the drive detection portion 820 that detects the surface texture of the measured object and supplies detection information to the calculator 810.

The calculator 810 includes the controller 811, the memory 812, the input portion 813, the display 814, and the communication portion 815. Of these, the functionality of each portion other than the communication portion 815 is similar to the functionality of each portion assigned the same reference numeral in the description of the conventional surface texture measuring device 800 illustrated in FIG. 3, and therefore a description thereof is omitted.

The communication portion 815 transmits a command to the external communication appliance 202 based on control executed by the controller 811, and also receives a response from the external communication appliance 202 and supplies the response to the controller 811. The communication portion 815 may use any communication format, which may be either wired or wireless without prejudice.

The drive detection portion 820 includes the driver 821 provided with the drive shaft 821a, and the detector 822 provided with the contact pin 822a. The functionality of each of these is the same as the functionality of the drive detection portion 820 of the conventional surface texture measuring device 800 illustrated in FIG. 3, and therefore a description thereof is omitted.

In the surface texture measuring device 102 having this configuration, a surface texture detection program is preloaded in the memory 812, the program being written with control content in which, based on a measurement instruction input from the input portion 813, the driver 821 is driven and the detector 822, which is in a state where the contact pin 822a is in contact with the surface of the measured object, is displaced in the X axis direction and the displacement distance in the X axis direction is successively acquired from the driver 821, and in addition, movement of the contact pin 822a in the Z axis direction, which corresponds to the current position of the driver 821, is successively acquired from the detector 822, and these measurement results are stored in the memory 812. When storing the displacement distance in the X axis direction and the movement in the Z axis direction in the memory 812, the movement in the Z axis direction may be stored as a function of the displacement distance in the X axis direction, for example.

The memory 812 is equivalent to the memory component 130 of the functional block diagram illustrated in FIG. 9, and is preloaded with the surface texture detection program as well as the correction values corresponding to each of a plurality of postures.

In addition, a measured posture acquisition program is further preloaded in the memory 812, the measured posture acquisition program being written with control content which, during execution of the surface texture detecting program, causes a command to be sent to the posture detecting sensor 120 of the external communication appliance 202 requiring that the measured posture be supplied, and causes a measured posture supplied from the external communication appliance 202 in response to the command to be stored in the memory 812.

The controller 811 reads and executes each program, and thereby performs control described in the program applicable to each component, thereby achieving the functions of the surface texture detecting component 110 in the functional block diagram of FIG. 9.

When storing the surface texture measurement results and the measured posture from the time of the measurement in the memory 812, the two are associated with each other and are stored based on the description of one of the surface texture detection program and the measured posture acquisition program.

Moreover, a correction program is preloaded in the memory 812, the program being written with control content in which a measured posture detected by the posture detecting sensor 120 is compared with the plurality of postures preloaded in the memory component 130, and when the memory component 130 contains a correction value that corresponds to a posture equivalent to the measured posture, the measurement results are corrected using the correction value and the corrected measurement results are stored in the memory 812 together with the measured posture.

The controller 811 reads and executes the correction program, and thereby performs control described in the program on each component, thereby achieving the functions of the correcting component 140 in the functional block diagram of FIG. 9.

Meanwhile, the external communication appliance 202 includes the controller 911, the memory 912, the input portion 913, the display 914, the communication portion 915, and the posture detecting sensor 120. When the external communication appliance 202 is an appliance that is either directly or incidentally provided with these functions, any communication appliance may be used, such as a smart phone.

However, because the posture of the surface texture measuring device 102 must be detected by the posture detecting sensor 120, which is provided to the external communication appliance 202, the external communication appliance 202 must be an appliance that can be fastened to the surface texture measuring device 102.

Any method of fastening the external communication appliance 202 on the surface texture measuring device 102 can be used. For example, the surface texture measuring device 102 may further include a fastener, which may be used to fasten the external communication appliance 202. Also, the external communication appliance 202 may further include a fastener, which may be used to fasten the external communication appliance 202. Furthermore, separate fasteners for each of the surface texture measuring device 102 and the external communication appliance 202 may be used to fasten the external communication appliance 202.

Also, when the calculator 810 and the drive detection portion 820 of the surface texture measuring device 102 are not integrated as illustrated in FIG. 2, but rather are provided separately as illustrated in FIG. 5, or are able to be separated, the external communication appliance 202 must be fastened to the drive detection portion 820, to which the detector 822 is provided.

The functionality of each portion other than the communication portion 915 of the external communication appliance 202 is similar to the functionality of each portion assigned the same reference numeral in the description of the surface texture measuring system 300, and therefore a description thereof is omitted.

The communication portion 915 receives a command transmitted from the surface texture measuring device 102 and supplies the command to the controller 911, and also transmits processing results of the controller 911 to the surface texture measuring device 102. The communication format used by the communication portion 915 is a format that can communicate with the communication portion 815.

In the external communication appliance 202 configured in this way, a posture supply program is preloaded in the memory 912, the program being written with control content in which, upon receiving a command requiring that the measured posture be supplied from the surface texture measuring device 102, the posture detected by the posture detecting sensor 120 is obtained and transmitted to the surface texture measuring device 102.

The controller 911 reads and executes the posture supply program, and thereby performs control described in the program on each component.

In addition, when the vibration detecting sensor 150 is added to the external communication appliance 202 to configure the surface texture measuring system 400 that is capable of executing control to stop when vibration occurs, the memory 912 is further preloaded with a vibration information supply program, the program being written with control content such that the program stands by for a signal indicating that vibration is detected to be input from the vibration detecting sensor 150, and identifies the magnitude of the vibration based on the signal when the signal is input, and transmits to the surface texture measuring device 102 vibration information that includes the magnitude of the vibration.

In addition, the memory 812 of the surface texture measuring device 102 is further preloaded with a vibration detection program, the program being written with control content such that the program stands by to receive the vibration information from the external communication appliance 202 and, when received, the program determines whether the vibration is greater than a predetermined magnitude and, when greater, causes execution of the surface texture detection program to stop.

The controller 811 reads and executes the vibration detection program and the controller 911 reads and executes the vibration information supply program, respectively, and thereby perform control described in the programs on each component.

Also, when the calculator 810 and the drive detection portion 820 of the surface texture measuring device 102 are not integrated as illustrated in FIG. 2, but rather are provided separately as illustrated in FIG. 5, or are able to be separated, the vibration detecting sensor 150 must be mounted on the drive detection portion 820, to which the detector 822 is provided.

The present invention as described above is not limited to the above-noted embodiments. The embodiments are provided by way of example, and embodiments that include configurations essentially identical to the technical ideas recited in the scope of the claims of the present invention and that achieve similar beneficial effects are included within the technical scope of the present invention. Specifically, the present invention may be modified as needed within the scope of the technical ideas reflected in the invention. Embodiments featuring such modifications or improvements are within the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface texture measuring device comprising:
   a surface texture detector that outputs measurement results for a surface texture of a measurable object, where the measurement results are recognized as a change in the movement of a contact pin of the surface texture detector when tracing a surface of the measurable object with the contact pin;
   a posture detection sensor detects a measured posture of the surface texture detector at the time of measurement by the surface texture detector;
   a memory that is preloaded with correction values corresponding to each of a plurality of postures; and
   a correcting comparator
      that compares the measured posture with the plurality of postures stored in the memory, and
      that corrects the measurement results using a correction value that corresponds to a posture equivalent to the measured posture of the surface texture detector when a difference between the measured posture and the posture equivalent is within a predetermined range.

2. The surface texture measuring device according to claim 1, wherein the posture detection sensor is configured to be attached and detached.

3. The surface texture measuring device according to claim 1, further comprising a vibration detection sensor that detects a magnitude of a vibration acting on the detector, wherein when the magnitude of the vibration during measurement of the surface texture exceeds a predetermined threshold value, the surface texture detector stops the measurement.

4. The surface texture measuring device according to claim 2, further comprising a vibration detection sensor that detects a magnitude of a vibration acting on the detector, wherein when the magnitude of the vibration during measurement of the surface texture exceeds a predetermined threshold value, the surface texture detector stops the measurement.

5. The surface texture measuring device according to claim 3, wherein the vibration detection sensor is configured to be attached and detached.

6. The surface texture measuring device according to claim 4, wherein the vibration detection sensor is configured to be attached and detached.

7. A surface texture measuring system comprising:
   a surface texture measuring instrument;
   an external communication interface that is attachable to the surface texture measuring instrument, wherein:
   upon receiving a command from the external communication interface, the surface texture measuring instrument transmits measurement results for a surface texture of a measurable object to the external communication interface, where the measurement results are recognized as a change in the movement of a contact pin of a detector when tracing a surface of the measurable object with the contact pin; and
   the external communication interface comprises:
   a posture detection sensor that detects a measured posture of the surface texture measuring instrument at the time of measurement by the surface texture measuring instrument;
   a memory that is preloaded with correction values corresponding to each of a plurality of postures;
   a measurement control transmitter that transmits a command to the surface texture measuring instrument requiring execution of a surface texture measurement and transmission of measurement results; and
   a correcting comparator that
      compares the measured posture with the plurality of postures stored in the memory, and
      corrects the measurement results received from the surface texture measuring instrument using a correction value that corresponds to a posture equivalent to the measured posture of the surface texture measuring instrument when a difference between the measured posture and the posture equivalent is within a predetermined range.

8. The surface texture measuring system according to claim 7, wherein the external communication interface further comprises a vibration detection sensor that detects a magnitude of a vibration acting on the detector, wherein when the magnitude of the vibration during measurement of the surface texture exceeds a predetermined threshold value, the measurement control transmitter transmits a command to the surface texture measuring instrument to stop the measurement.

9. At least one tangible, non-transitory computer-readable medium storing an executable set of instructions for controlling an external communication interface that is attachable to a surface texture measuring instrument, wherein upon receiving a command from the external communication interface, the surface texture measuring instrument transmits measurement results for a surface texture of a measurable object to the external communication interface, and wherein the measurement results are recognized as a change in the movement of a contact pin of a detector when tracing a surface of the measurable object with the contact pin, the external communication interface including a posture detection sensor that detects a measured posture of the surface texture measuring instrument at the time of measurement by the surface texture measuring instrument, and a memory that is preloaded with correction values corresponding to each of a plurality of postures, wherein the set of instructions, when executed by a computer processor, causes the computer processor to execute operations comprising:

transmitting a command to the surface texture measuring instrument requiring execution of a surface texture measurement and transmission of measurement results;

comparing the measured posture with the plurality of postures stored in the memory; and correcting the measurement results received from the surface texture measuring instrument using a correction value that corresponds to a posture equivalent to the measured posture of the surface texture measuring instrument when a difference between the measured posture and the posture equivalent is within a predetermined range.

10. The surface texture measuring device according to claim 1, wherein:

the posture detection sensor comprises a gyrosensor.

11. The surface texture measuring device according to claim 3, wherein:

the vibration detecting sensor comprises an accelerometer.

12. The surface texture measuring system according to claim 7, wherein:

the posture detection sensor comprises a gyrosensor.

13. The surface texture measuring system according to claim 8, wherein:

the vibration detecting sensor comprises an accelerometer.

* * * * *